United States Patent
Flippin et al.

(10) Patent No.: US 8,907,625 B2
(45) Date of Patent: Dec. 9, 2014

(54) BATTERY MANAGEMENT SYSTEMS WITH VERTICAL BUS CIRCUITS

(75) Inventors: Allan Flippin, Brentwood, CA (US);
William Densham, Los Gatos, CA (US);
Jiun Heng Goh, Sunnyvale, CA (US);
Constantin Bucur, Sunnyvale, CA (US); Flavius Lupu, San Jose, CA (US);
Stefan Maireanu, Sunnyvale, CA (US)

(73) Assignee: O2Micro, Inc., Santa Clara, CA (US)

( * ) Notice: Subject to any disclaimer, the term of this patent is extended or adjusted under 35 U.S.C. 154(b) by 777 days.

(21) Appl. No.: 13/184,384

(22) Filed: Jul. 15, 2011

(65) Prior Publication Data

US 2013/0019037 A1 Jan. 17, 2013

(51) Int. Cl.
*H01M 10/44* (2006.01)
*H01M 10/46* (2006.01)
*H01M 10/42* (2006.01)
*H02J 7/00* (2006.01)

(52) U.S. Cl.
CPC ........... *H01M 10/425* (2013.01); *H02J 7/0021* (2013.01)
USPC ........................................................ 320/116

(58) Field of Classification Search
CPC ..... H02J 7/0021; H02J 7/0024; H02J 7/0013; H02J 7/0016
USPC ................ 320/107, 114, 116, 117, 118, 119; 713/1; 710/100
See application file for complete search history.

(56) References Cited

U.S. PATENT DOCUMENTS

| | | | |
|---|---|---|---|
| 6,181,103 B1 | 1/2001 | Chen | |
| 6,871,244 B1 | 3/2005 | Cahill et al. | |
| 7,058,739 B2 | 6/2006 | Wu | |
| 2003/0225995 A1 | 12/2003 | Schroter et al. | |
| 2004/0075636 A1 | 4/2004 | Pai | |
| 2009/0027009 A1 | 1/2009 | Sivertsen | |
| 2010/0173180 A1 | 7/2010 | Li | |
| 2011/0001357 A1 | 1/2011 | Li et al. | |
| 2013/0019118 A1* | 1/2013 | Flippin | 713/340 |

FOREIGN PATENT DOCUMENTS

| | | |
|---|---|---|
| CN | 1292123 A | 4/2001 |
| CN | 1656470 A | 8/2005 |
| CN | 1818895 A | 8/2006 |
| CN | 101119036 A | 2/2008 |
| CN | 101770685 A | 7/2010 |
| CN | 101944640 A | 1/2011 |
| EP | 1063593 A1 | 12/2000 |

OTHER PUBLICATIONS

Datasheet of "LTC6803-1/LTC6803-3, Multicell Battery Stack Monitor", Linear Technology (40 pages).

(Continued)

*Primary Examiner* — Edward Tso

(57) ABSTRACT

A battery management chip may include a battery management unit and a vertical bus circuit. The battery management unit can monitor a cell status of multiple cells in a battery module coupled to the battery management chip in response to an instruction from a host processor. The vertical bus circuit may transfer the instruction from the host processor to the battery management unit. The vertical bus circuit may include a first receiver, a command processor and a first transmitter. The first receiver can receive a first pair of differential input data signals. The command processor can process the first pair of differential input data signals. The first transmitter can output a first pair of differential output data signals.

24 Claims, 8 Drawing Sheets

(56) References Cited

OTHER PUBLICATIONS

Datasheet of "LTC6802-2/LTC6803-4, Multicell Battery Stack Monitor", Linear Technology (40 pages).

"SPI Block Guide", Motorola, Inc., Feb. 4, 2003, V03.06 (38 pages).
System Management Bus (SMBus) Specification, SBS Implementers Forum, Version 2.0, Aug. 3, 2000 (59 pages).

* cited by examiner

BATTERY MANAGEMENT SYSTEMS WITH VERTICAL BUS CIRCUITS

CROSS REFERENCE TO RELATED APPLICATION

This application is related to the application Ser. No. 13/184,405 entitled "Battery Management Systems with Enumerating Circuits," by A. Flippin, filed concurrently herewith.

BACKGROUND

Multiple battery modules can be used to power various electronic devices. To monitor the statuses of the battery modules, multiple battery management chips can be coupled to the battery modules. A host processor can be used to communicate with the battery management chips.

FIG. 1 shows a block diagram of a conventional battery management system 100 with a host processor 120 that communicates with the battery management chips via a common bus 130. As shown in FIG. 1, the conventional battery management system 100 includes battery modules 140-1-140-3 that are coupled to battery management chips 101-103, respectively. Each of the battery modules 140-1-140-3 can include one or more battery cells. The battery management chips 101-103 can monitor the cell status of the battery modules 140-1-140-3, respectively. The battery management system 100 further includes a host processor 120 used to communicate with the battery management chips 101-103 via a common bus 130. The common bus 130 operates at the host processor 120's voltage. However, the cumulative voltage of the multiple battery modules 140-1-140-3 coupled in series can expose the common bus 130 to a high voltage potential. In order to isolate the common bus 130 from the relatively high voltage potential, multiple isolators 110-1-110-3 are used. Each of the isolators 110-1-110-3 includes multiple opto-couplers, e.g., two opto-coupler pairs as shown in FIG. 1. The isolators 110-1-110-3 are coupled between the battery management chips 101-103 and the common bus 130 to isolate the common bus 130 from the relatively high voltage potential to protect the battery management system 100. However, the opto-couplers are relatively expensive. As a result, the cost of the system is relatively high.

FIG. 2 shows a block diagram of a conventional battery management system 200 with a host processor 220 that communicates with the battery management chips. The conventional battery management system 200 includes battery modules 240-1-240-3 that are coupled to battery management chips 201-203, respectively. The battery management chips 201-203 are coupled to each other via an upward bus and a downward bus, e.g., a Serial Peripheral Interface (SPI) bus. The battery management system 200 further includes a host processor 220 coupled to the bottom battery management chip 203 via the upward bus and the downward bus. As a result, the host processor 220 can communicate with the battery management chips 201-203 via the upward bus and the downward bus. However, when a connection break occurs between adjacent battery modules, a relatively large negative voltage is generated at the break node due to the resulting quick current change in the battery management system 200, e.g., the current changes from a relatively large value to zero quickly. The relatively large negative voltage is high enough to damage the battery management chips adjacent the connection break, e.g., battery management chips 201 and 202 can be damaged when the connection break occurs between battery modules 240-1 and 240-2.

FIG. 3 shows a block diagram of a conventional battery management system 300. The conventional battery management system 300 includes battery modules 340-1 and 340-2, battery management chips 301 and 302 coupled to the battery modules 340-1 and 340-2 respectively, and a host processor 320. Battery management chip 301 is coupled to the battery management chip 302 via high-voltage diodes 331 and 332 to protect the battery management chips 301 and 302 from being damaged due to a high negative voltage caused by a connection break between battery modules 340-1 and 340-2. The diodes 331 and 332 are forward-biased in normal operation, and reverse-biased when the negative voltage is generated to protect the battery management system 300 from being damaged. Because the negative voltage is relatively high, e.g., higher than 600V in some applications, in order to protect the battery management system 300, the reverse voltages of the diodes 331 and 332 are also relatively high. However, a high-voltage diode is relatively expensive. Moreover, the high-voltage diodes respond relatively slowly. The battery management chips 301 and 302 may be damaged before the diodes 331 and 332 can respond and take protective action. In addition, a few milliamps of current are needed to ensure forward conduction, which results in high operating power consumption.

SUMMARY

In one embodiment, a battery management chip includes a battery management unit and a vertical bus circuit. The battery management unit monitors a cell status of multiple cells in a battery module coupled to the battery management chip in response to an instruction from a host processor. The vertical bus circuit transfers the instruction from the host processor to the battery management unit. The vertical bus circuit includes a first receiver, a command processor and a first transmitter. The first receiver receives a first pair of differential input data signals. The command processor is coupled to the first receiver and processes the first pair of differential input data signals. The first transmitter is coupled to the command processor and outputs a first pair of differential output data signals.

In another embodiment, a system includes a first chip, a second chip and a host processor. The first chip includes a first vertical bus circuit. The second chip is coupled to the first chip via a passive galvanic isolator. The host processor is coupled to the first chip and sends first data to the first chip and the second chip. The host processor is coupled to the first vertical bus circuit via a converter. The converter converts the first data from a first type of protocol to a first pair of differential data signals that conform to a second type of protocol.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Figure 1:
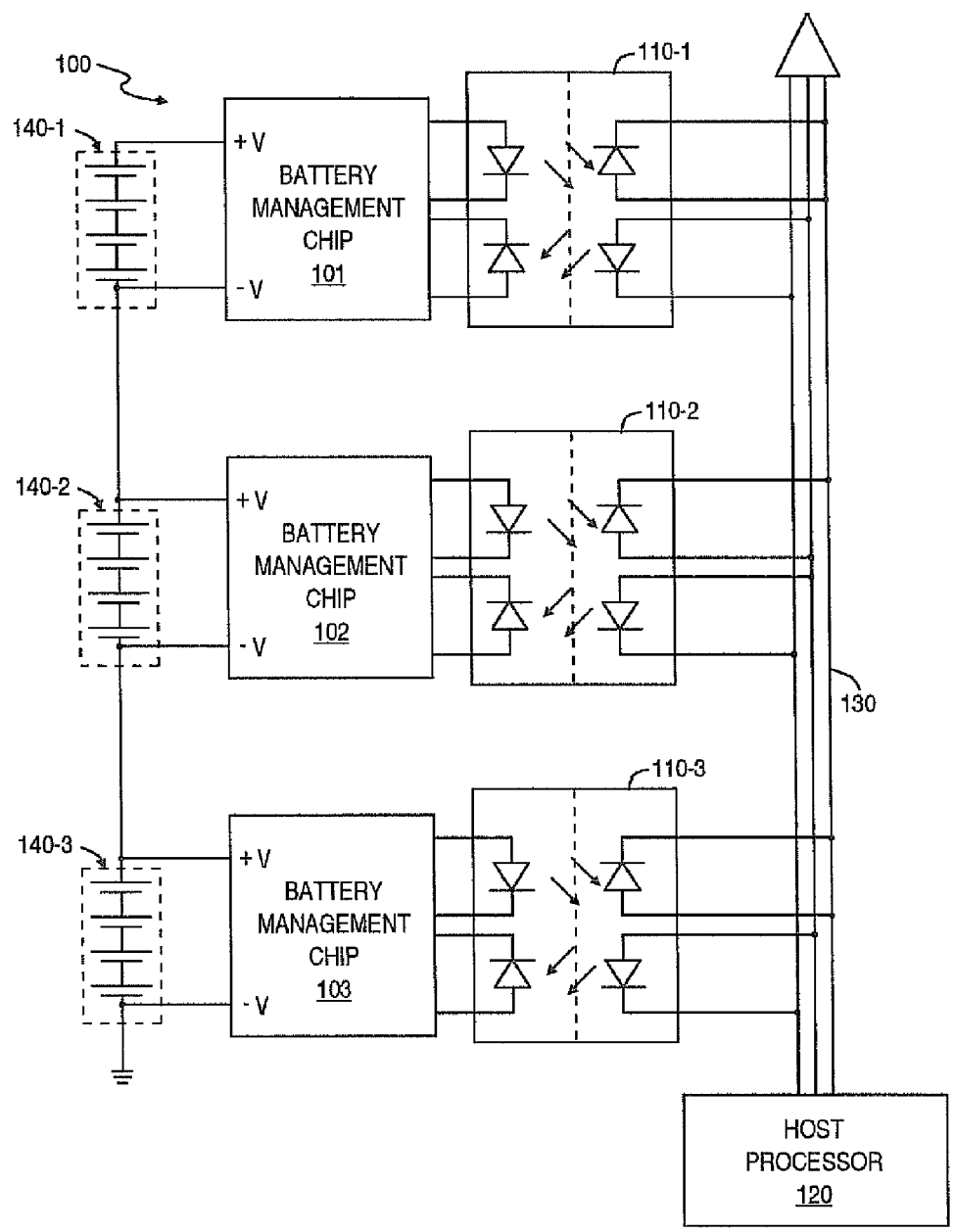
FIG. 1 shows a block diagram of a conventional battery management system.
Figure 2:
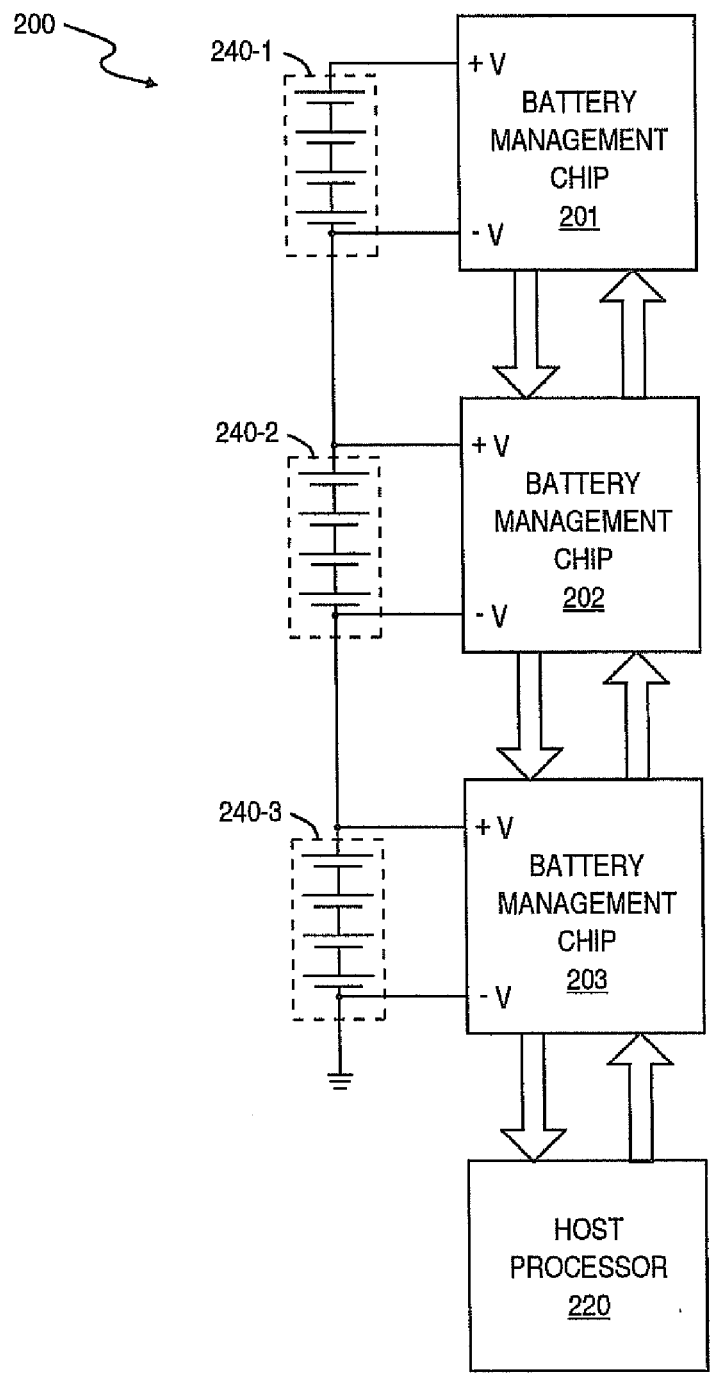
FIG. 2 shows a block diagram of another conventional battery management system.
Figure 3:
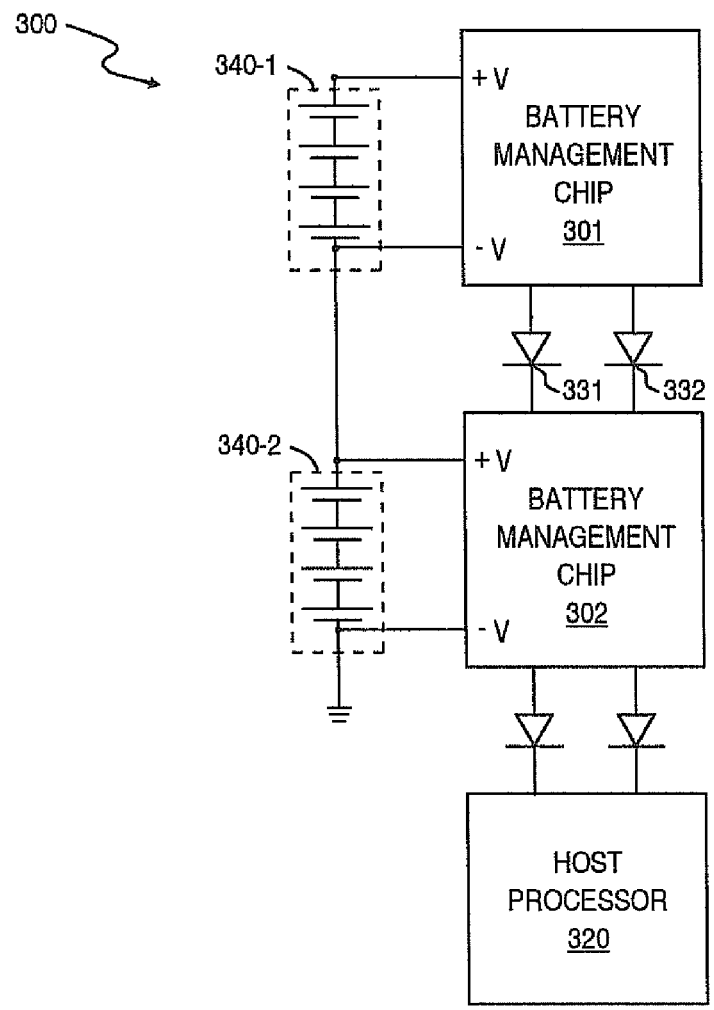
FIG. 3 shows a block diagram of another conventional battery management system.

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "sending," "detecting," "converting," "comparing," "determining" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 4:
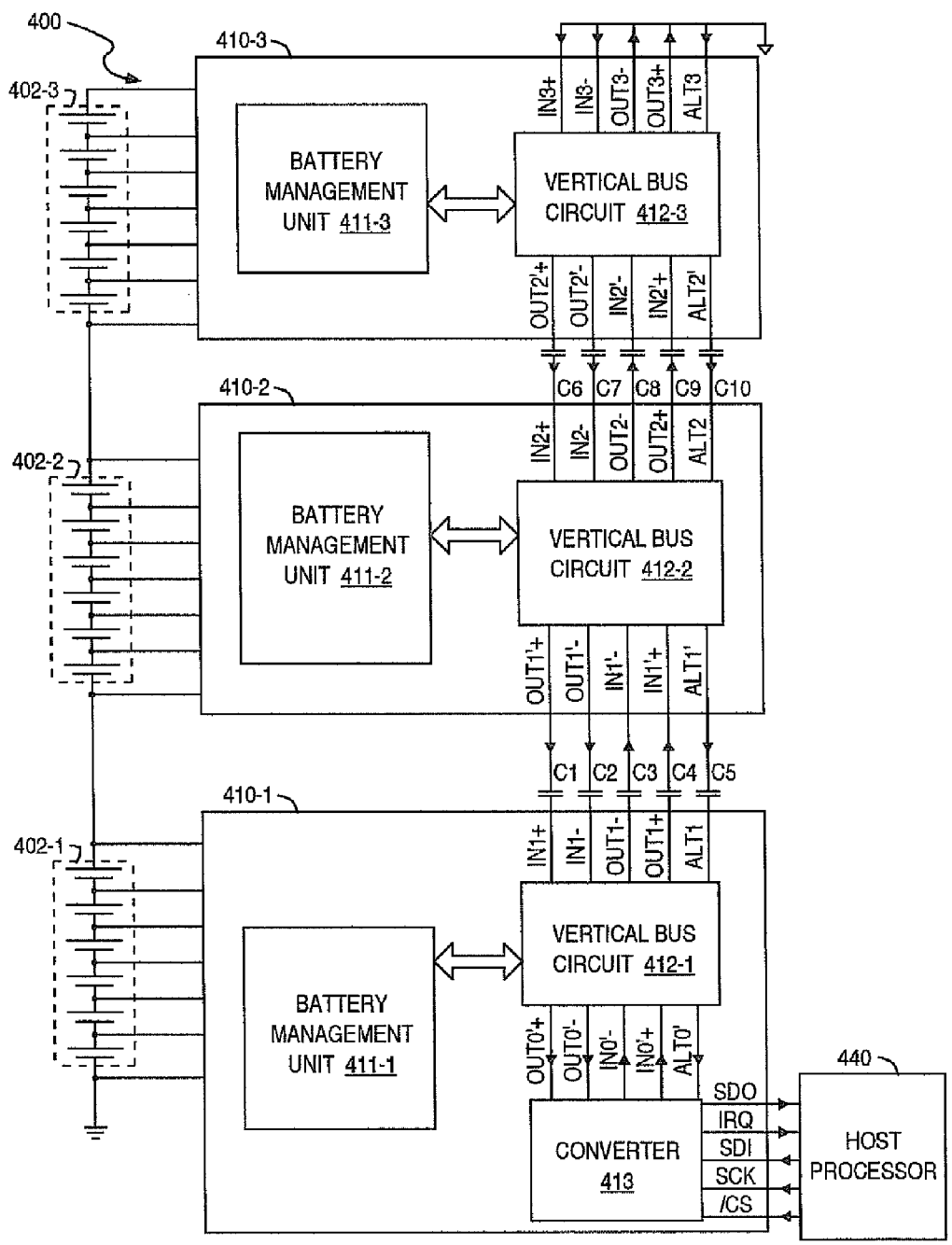
FIG. 4 shows a block diagram of an example of a battery management system, in accordance with one embodiment of the present invention.

FIG. 4 shows a block diagram of an example of a battery management system 400, in accordance with one embodiment of the present invention. In one embodiment, the battery management system 400 includes battery modules 402-$i$, e.g., 402-1, 402-2 and 402-3, coupled in series, battery management chips 410-$i$, e.g., 410-1, 410-2 and 410-3, coupled to the battery modules 402-1, 402-2 and 402-3, respectively, and a host processor 440 coupled to the battery management chip 410-1. Since the embodiment shown in FIG. 4 is only for illustrative purposes, the number of the battery management chips can be changed to any number depending on the requirements of the particular application.

A battery module 402-$i$ further includes one or more battery cells, e.g., six battery cells as shown in the example of FIG. 4. The battery management chips 410-1, 410-2 and 410-3 are coupled to each other via one or more galvanic isolators. In one embodiment, the galvanic isolators are passive isolators so that no additional power supply is needed to power the galvanic isolators. For example, multiple capacitors C1-C10 can be used in the battery management system 400 to galvanically isolate the battery management chips 410-1-410-3. As shown in the example of FIG. 4, battery management chip 410-3 is coupled to the battery management chip 410-2 via capacitors C6-C10, and battery management chip 410-2 is coupled to the battery management chip 410-1 via capacitors C1-05. In another embodiment, multiple transformers or inductors can also be used in the battery management system 400 to galvanically isolate the battery management chips 410-1-410-3. By using the galvanic isolators between the adjacent battery management chips, the battery management chips are galvanically isolated and are protected if a connection break occurs between adjacent battery modules. Moreover, the cost of the battery management system is reduced by using the passive galvanic isolators.

In one embodiment, each battery management chip 410-$i$ includes a corresponding battery management unit 411-$i$ and a corresponding vertical bus circuit 412-*i*. The battery management unit 411-*i* can monitor and sample the status (e.g., cell voltage) of each battery cell in the corresponding battery module 402-*i* according to an instruction received from the host processor 440. The vertical bus circuit 412-*i* transfers signals between the battery management unit 411-*i* and the host processor 440.

In one embodiment, the vertical bus circuit 412-*i* receives a first pair of differential input data signals (e.g., a positive differential signal INPUT+ and a negative differential signal INPUT−) via pins IN(i−1)'+ and IN(i−1)'− from the lower battery management chip 410-(*i*−1) and outputs a first pair of differential output data signals (e.g., a positive differential signal OUTPUT+ and a negative differential signal OUTPUT−) via pins OUTi+ and OUTi− to the upper battery management chip 410-(*i*+1). In one embodiment, the first pair of differential input/output signals represents an instruction from the host processor 440, e.g., instructing each battery management unit 411-*i* to monitor and sample the cell voltage of each battery cell in the corresponding battery module 402-*i*. The vertical bus circuit 412-*i* further receives a second pair of differential input data signals via pins INi+ and INi− from the upper battery management chip 410-(*i*+1) and outputs a second pair of differential output data signals via pins OUT(i−1)'+ and OUT(i−1)'− to the lower battery management chip 410-(*i*−1). In one embodiment, the second pair of differential input/output signals represents the cell status, e.g., cell voltage, of each battery cell in the upper battery modules. In one embodiment, the second pair of differential output signals represents the cell status, e.g., cell voltage, of each battery cell in the corresponding battery module 402-*i*, and each cell voltage is monitored by the battery management unit 411-*i*. In one embodiment, the pins IN3+, IN3−, OUT3+ and OUT3− of the battery management chip 410-3 are coupled to the ground, indicating that the battery management chip 410-3 is the top chip; as such, the battery management chip 410-3 does not receive the second pair of differential input data signals via pins IN3+ and IN3; however, the battery management chip 410-3 can output the second pair of differential output data signals via pins OUT2'+ and OUT2'− to the lower battery management chip 410-2. In one embodiment, the vertical bus circuit 412-1 in the bottom battery management circuit 410-1 receives the first pair of differential input data signals via pins IN0'+ and IN0'− from a converter 413 and outputs the first pair of differential output data signals via pins OUT1+ and OUT1− to the upper battery management chip 410-2. The vertical bus circuit 412-1 further receives the second pair of differential input data signals via pins IN1+ and IN1− from battery management chip 410-2 and outputs the second pair of differential output data signals via pins OUT0'+ and OUT0'− to the converter 413. The vertical bus circuit 412-*i* can further provide an alert signal via a pin ALT(i−1)' to inform the host processor 440 of the status of the corresponding battery management chip 410-*i* (for example, whether self-testing of the battery management chip 410-*i* is completed) and to request service from the host processor 440. The alert signal is sent to the lower battery management chip 410-(*i*−1) and is further transferred to the host processor 440.

Advantageously, by using the differential input/output data signals, noise on the vertical bus is reduced or eliminated. Moreover, in one embodiment, if an abnormal condition (e.g., an open circuit or a short circuit) occurs on any bus that is transferring differential data signals, communication can continue by using a single wire of the differential signal pair. In another embodiment, if an abnormal condition occurs as just described, communication can continue by using the other pair of wires to transmit the differential input/output data signals. Thus, the wires transferring the differential input/output data signals can operate in a bidirectional mode.

In one embodiment, the converter 413 is coupled to the host processor 440 and the vertical bus circuit 412-1 as shown in the example of FIG. 4. The converter 413 communicates with the host processor 440 using a first type of protocol, e.g., the Serial Peripheral Interface (SPI) bus protocol. The signals transferred between the converter 413 and the host processor 440 include an output data signal transferred from the converter 413 to the host processor 440 via a pin SDO, an interrupt request signal transferred from the converter 413 to the host processor 440 via a pin IRQ, an input data signal transferred from the host processor 440 to the converter 413 via a pin SDI, and a clock signal and an enable signal transferred from the host processor 440 to the converter 413 via a pin SCK and a pin/CS, respectively. In one embodiment, the converter 413 communicates with the vertical bus circuit 412-1 using a second type of protocol, e.g., a vertical bus protocol, and the battery management chip 410-*i* communicates with the adjacent battery management chips 410-(*i*+1) and 410-(*i*−1) using the second type of protocol, e.g., vertical bus protocol. The converter 413 is able to convert the data communicated using the first type of protocol and received from the host processor 440 via the pin SDI into a pair of differential data signals that are communicated using the second type of protocol and can be transferred to the vertical bus circuit 412-1 via pins IN0'− and IN0'+. Similarly, the converter 413 is also able to convert the pair of differential data signals that are communicated with the second type of protocol and are received from the vertical bus 412-1 via pins OUT0'− and OUT0'+ into data that can be communicated with the first type of protocol and that can be transferred to the host processor 440 via the pin SDO. In the example of FIG. 4, the converter 413 is integrated in the battery management chip 410-1. However, the converter 413 can be also located outside the battery management chip 410-1.

Figure 5A:
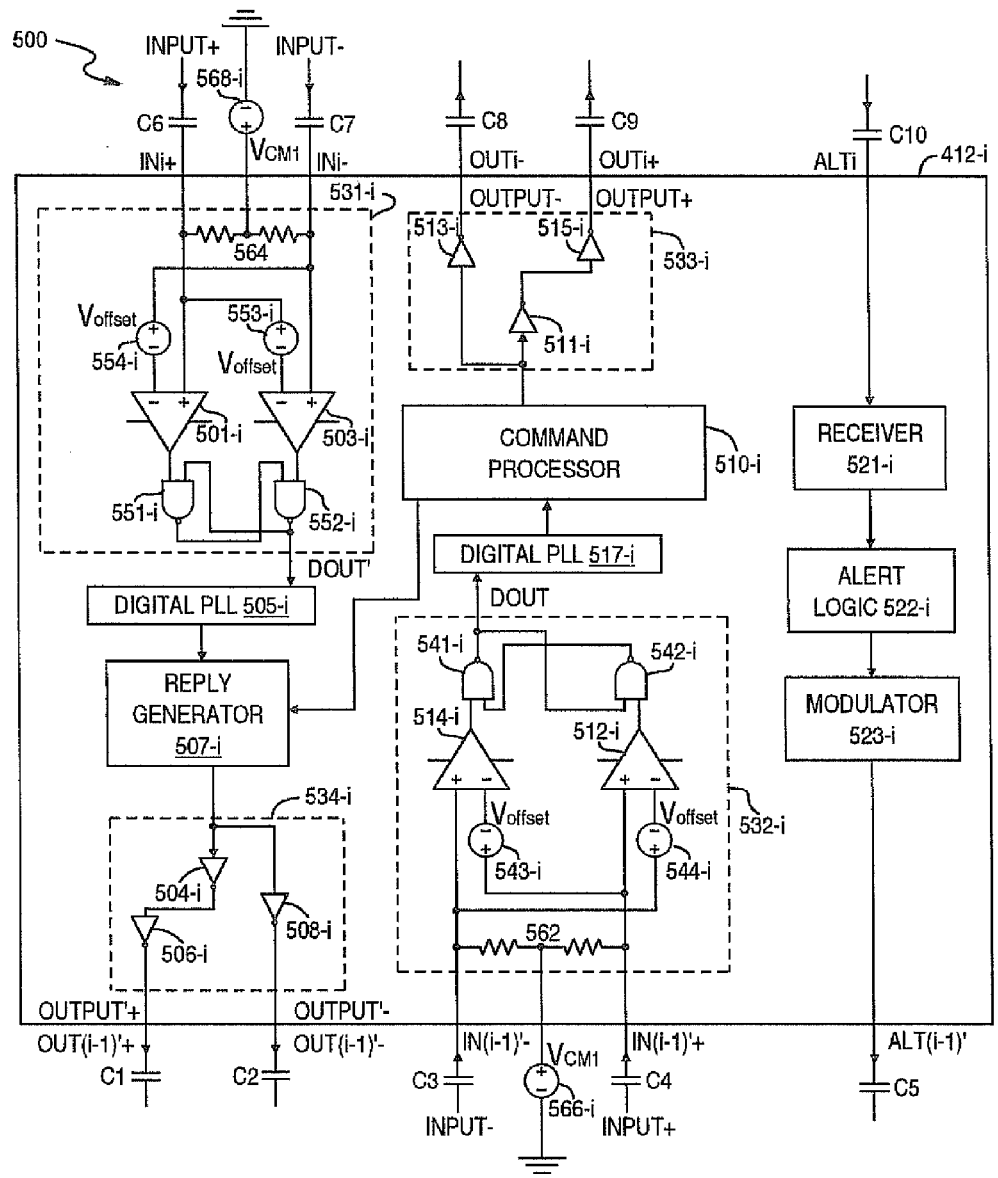
FIG. 5A shows a block diagram of an example of a vertical bus circuit, in accordance with one embodiment of the present invention.

FIG. 5A shows a block diagram of an example of a vertical bus circuit 412-*i* in the battery management chip 410-*i* in FIG. 4, in accordance with one embodiment of the present invention. FIG. 5A is described in combination with FIG. 4.

In one embodiment, the vertical bus circuit 412-*i* includes a downward data path, an upward data path, and an alert data path. The upward data path includes a receiver 532-*i*, a digital phase-locked loop (PLL) 517-*i*, a command processor 510-*i*, and a transmitter 533-*i*. The downward data path includes a receiver 531-*i*, a digital phase-locked loop (PLL) 505-*i*, a reply generator 507-*i*, and a transmitter 534-*i*. The alert data path includes a receiver 521-*i*, an alert logic 522-*i*, and a modulator 523-*i*.

The receiver 532-*i* includes a pair of comparators 512-*i* and 514-*i* for receiving a first pair of differential input data signals INPUT+ and INPUT− via pins IN(i−1)'+ and IN(i−1)'−. For example, the pin IN(i−1)'+ receives the positive differential signal INPUT+ of the differential signals and the pin IN(i−1)'− receives the negative differential signal INPUT− of the differential signals. A common mode voltage $V_{CM1}$ is provided at the node 562 by a voltage source 566-*i*, to provide a steady-state voltage for signals IN+ and IN− (not shown in the example of FIG. 5A) received by the receiver 532-*i* via the capacitors C4 and C3, respectively.

In one embodiment, an offset voltage $V_{offset}$ is provided to define a hysteresis area for an output signal DOUT of the receiver 532-*i*, and further for noise rejection and high frequency signal rejection. As shown in the example of FIG. 5A, the non-inverting terminal of the comparator 512-*i* is coupled to the inverting terminal of the comparator 514-*i* through an embedded offset voltage generator, e.g., a voltage source 543-$i$. The non-inverting terminal of the comparator 514-$i$ is coupled to the inverting terminal of the comparator 512-$i$ through an embedded offset voltage generator, e.g., a voltage source 544-$i$ as shown in the example of FIG. 5A. The voltage across each of the voltage sources 543-$i$ and 544-$i$ is equal to $V_{offset}$. As shown in the example of FIG. 5A, the negative terminal of the voltage source 544-$i$ is coupled to the inverting terminal of the comparator 512-$i$, and the negative terminal of the voltage source 543-$i$ is coupled to the inverting terminal of the comparator 514-$i$. In another embodiment, the positive terminal of the voltage source 544-$i$ can also be coupled to the non-inverting terminal of the comparator 512-$i$. The positive terminal of the voltage source 543-$i$ can be coupled to the non-inverting terminal of the comparator 514-$i$.

In one embodiment, the embedded offset voltage generator can be implemented by a voltage source as shown in the example of FIG. 5A. In another embodiment, the embedded offset voltage generator can instead be implemented by a resistor with a current flowing through the resistor.

As shown in the example of FIG. 5A, each of the comparators 512-$i$ and 514-$i$ is coupled to an NAND gate. For example, the output of the comparator 512-$i$ is coupled to the NAND gate 542-$i$, and the output of the comparator 514-$i$ is coupled to the NAND gate 541-$i$. The output of the NAND 541-$i$ is coupled to the digital PLL 517-$i$ to provide the output data signal DOUT indicative of the positive differential data signal INPUT+ received at the pin IN($i$−1)'+ to the digital PLL 517-$i$, for synchronization. In another embodiment, the output of the NAND 542-$i$ can be coupled to the digital PLL 517-$i$ to provide the output data signal indicative of the negative differential data signal INPUT− received at the pin IN($i$−1)'− to the digital PLL 517-$i$. In one embodiment, comparators 512-$i$ and 514-$i$ can be integrated into a differential input comparator.

In one embodiment, as shown in the example of FIG. 5A, the comparators 512-$i$ and 514-$i$, the offset voltage generators 544-$i$ and 543-$i$, and the NAND gates 541-$i$ and 542-$i$ can be implemented as a hysteresis unit for the output signal DOUT of the receiver 532-$i$. If the difference between the signals IN+ and IN− is greater than the offset voltage $V_{offset}$, the output signal DOUT can be logic low or logic high. More specifically, the output signal DOUT can be logic high as given by equation (1):

$$V_{IN+} - V_{IN-} > V_{offset} \quad (1)$$

The output signal DOUT can be logic low as given by equation (2):

$$V_{IN+} - V_{IN-} < -V_{offset} \quad (2)$$

If the difference between the signals IN+ and IN− is less than the offset voltage $V_{offset}$, as shown in equation (3), the output signal DOUT keeps its previous status and is unchanged.

$$|V_{IN+} - V_{IN-}| < V_{offset} \quad (3)$$

Figure 5B:
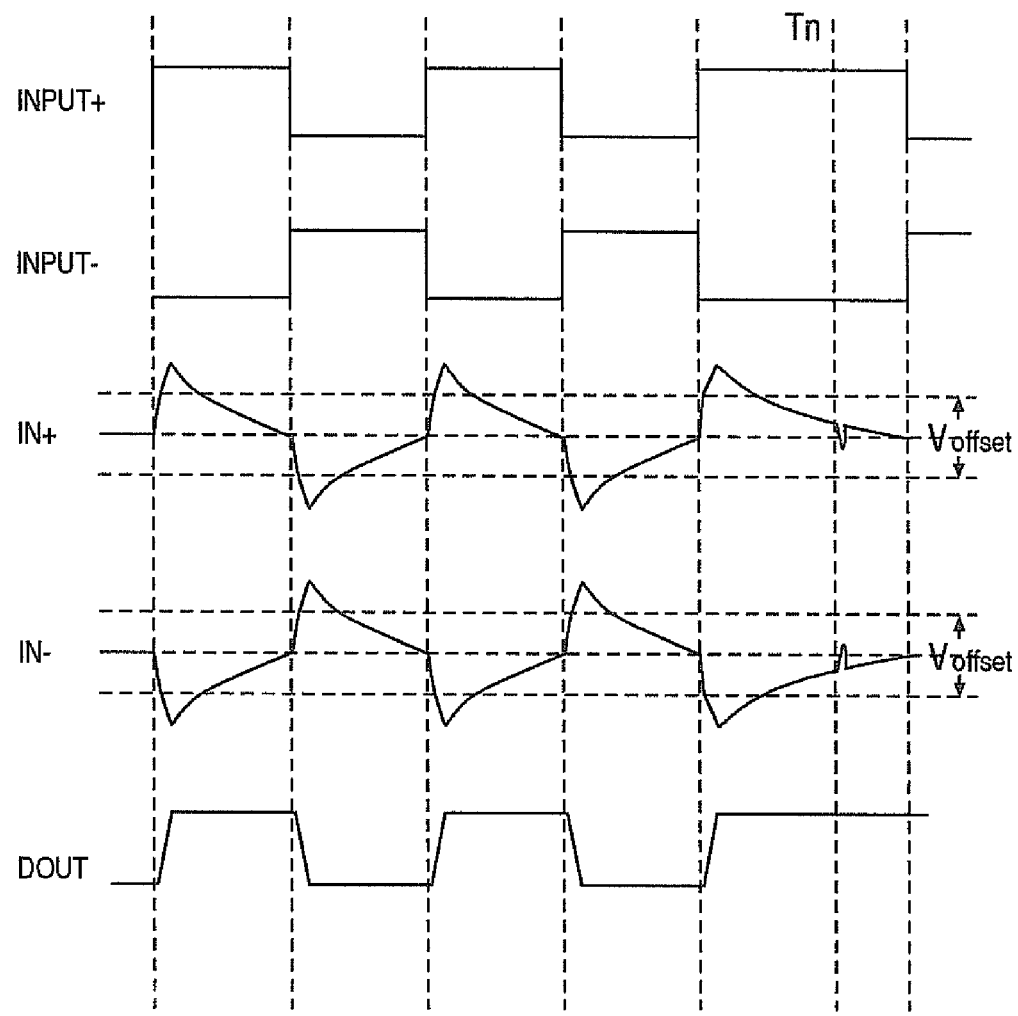
FIG. 5B shows an example of signals associated with a receiver in a vertical bus circuit, in accordance with one embodiment of the present invention.

FIG. 5B shows an example of signals associated with the receiver 532-$i$ in the vertical bus circuit 412-$i$ as shown in FIG. 5A. Signals INPUT+ and INPUT− represent the differential input data signals sent to the capacitors C4 and C3, respectively, from the lower battery management chip 410-($i$−1). In another embodiment, signals INPUT+ and INPUT− represent the differential input data signals from the converter 413 if the battery management chip is the bottom battery management chip 410-1. Signals IN+ and IN− are signals that are received by the receiver 532-$i$ via capacitors C4 and C3 respectively. Signal DOUT is output by the NAND gate 541-$i$, and it represents the output of the receiver 532-$i$. In one embodiment, DOUT is indicative of the positive differential data signal INPUT+ received by the capacitor C4. As shown in the example of FIG. 5B, if there is noise at the pins IN($i$−1)'+ and IN($i$−1)'− at time Tn, then that noise can be canceled out in the signal DOUT if the difference of the differential signals IN+ and IN− is within the hysteresis area which is defined by the offset voltage $V_{offset}$.

Referring back to FIG. 5A, the digital PLL 517-$i$ synchronizes the received data signal with the clock in the battery management chip 410-$i$ and sends the synchronized data to the command processor 510-$i$. The command processor 510-$i$ can process the synchronized data. In one embodiment, when the synchronized data indicates an instruction from the host processor 440, e.g., an instruction for a battery management chip 410-$i$ to sample the cell voltages of a corresponding battery module 402-$i$, the command processor 510-$i$ can compare the address in the synchronized data with the address of the corresponding battery management chip 410-$i$. If the addresses match, the command processor 510-$i$ sends the data to the reply generator 507-$i$. In one such embodiment, the reply generator 507-$i$ instructs the battery management chip 410-$i$ to implement the instruction, e.g., instructs the battery management unit 411-$i$ to sample the cell voltages of the corresponding battery module 402-$i$, and generates a reply to the host processor 440. If the addresses do not match, the command processor 510-$i$ sends the synchronized data to the transmitter 533-$i$. The transmitter 533-$i$ includes multiple inverters 511-$i$, 513-$i$ and 515-$i$ as shown in the example of FIG. 5A. The inverters 511-$i$ and 515-$i$ can drive and output a positive differential signal, and the inverter 513-$i$ can drive and output a negative differential signal. As such, the transmitter 533-$i$ outputs a pair of differential output data signals indicative of the synchronized data via the pins OUT$i$+ and OUT$i$− to the vertical bus circuit 412-($i$+1) in the battery management chip 410-($i$+1).

The elements and configurations in the receiver 531-$i$ in the downward data path are the same as shown in the receiver 532-$i$. Therefore, elements in the receiver 531-$i$ having similar functions as in the receiver 532-$i$ will not be repetitively described herein for brevity and clarity.

Figure 5C:
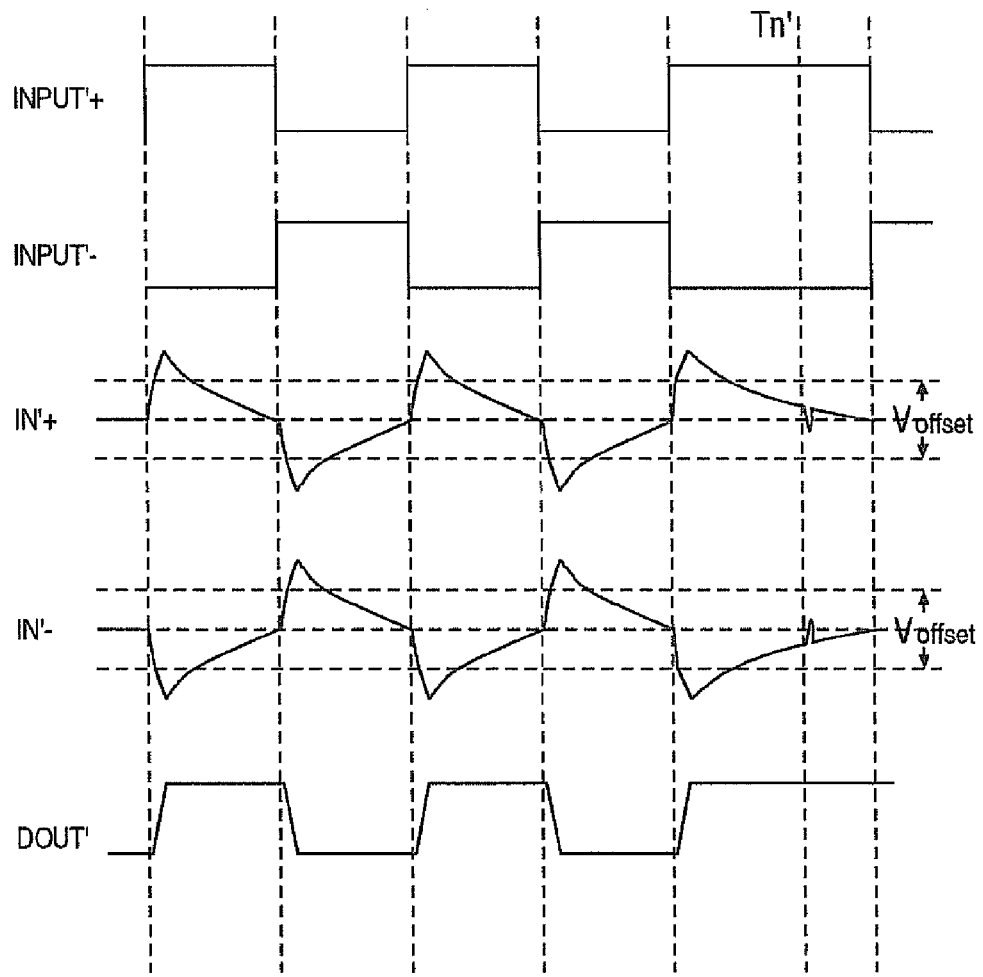
FIG. 5C shows an example of signals associated with a receiver in a vertical bus circuit, in accordance with one embodiment of the present invention.

FIG. 5C shows an example of signals associated with the receiver 531-$i$ in the vertical bus circuit 412-$i$ as shown in FIG. 5A. Signals INPUT'+ and INPUT'− represent the differential input data signals sent to the capacitors C6 and C7, respectively, from the upper battery management chip 410-($i$+1). Signals IN'+ and IN'− are signals received by the receiver 531-$i$ via the capacitors C6 and C7, respectively. Signal DOUT' is output by the NAND gate 552-$i$, and it represents the output of the receiver 531-$i$. In one embodiment, signal DOUT' is indicative of the positive differential data signal INPUT'+ received via the capacitor C6. As shown in the example of FIG. 5C, if there is noise existing at the pins IN$i$+ and IN$i$− at time Tn', then that noise can be canceled out in the output signal DOUT' if the difference of the differential signals IN'+ and IN'− is within the hysteresis area which is defined by the offset voltage $V_{offset}$.

Referring back to FIG. 5A, the output data signal of the receiver 531-$i$ is sent to the digital PLL 505-$i$. The digital PLL 505-$i$ synchronizes the received data signal with the clock in the battery management chip 410-$i$ and sends the synchronized data to the reply generator 507-$i$. In one embodiment, the reply generator 507-$i$ receives the synchronized data and transfers the synchronized data to the transmitter 534-$i$. In another embodiment, the reply generator 507-$i$ generates a reply in response to an instruction from the host processor 440 and sends the reply to the host processor 440 via the transmitter 534-$i$. The transmitter 534-$i$ includes multiple inverters 504-$i$, 506-$i$ and 508-$i$ as shown in the example of FIG. 5A. The inverters 504-$i$ and 506-$i$ can drive and output a positive differential signal, and the inverter 508-$i$ can drive and output a negative differential signal. As such, the transmitter 534-$i$ outputs a pair of differential output data signals indicative of the data received from the reply generator 507-$i$ to the vertical bus circuit 412-($i$−1) in the battery management chip 410-($i$−1) via the pins OUT($i$-1)'+ and OUT($i$-1)'−. However, if the battery management chip 410-$i$ is the bottom battery management chip 410-1, the transmitter 534-1 outputs the pair of differential output data signals via the pins OUT0'+ and OUT0'− to the converter 413. The converter 413 can convert the received pair of differential data signals into data which conforms to the first type of protocol, e.g., SPI bus protocol, and send the converted data to the host processor 440.

Advantageously, the receivers 531-$i$ and 532-$i$ as shown in the example of FIG. 5A have relatively low power consumption and simple circuitry. Moreover, noise that exists at the pins (e.g., pins IN($i$-1)'+, IN($i$-1)'−, IN$i$+ and IN$i$−) can be canceled out if the difference of the differential input signals of the receiver 532-$i$/531-$i$ is within the hysteresis area which is defined by the offset voltage $V_{offset}$.

In one embodiment, the alert logic 522-$i$ in the vertical bus circuit 412-$i$ can provide an alert signal to inform the host processor 440 of the status of the corresponding battery management chip 410-$i$, for example, whether self-testing of the battery management chip 410-$i$ is completed, and to request service from the host processor 440. The alert signal is transferred to the modulator 523-$i$ for encoding. The encoded alert signal is sent to the vertical bus circuit 412-($i$−1) in the battery management chip 410-($i$−1) via the pin ALT($i$-1)'. In one embodiment, when the encoded alert signal is received by the receiver 521-($i$−1) in the vertical bus circuit 412-($i$−1), the receiver 521-($i$−1) transfers the received encoded alert signal to the alert logic 522-($i$−1). The alert logic 522-($i$−1) decodes the received encoded alert signal and sends the decoded alert signal to the modulator 523-($i$−1) for encoding. After encoding, a new encoded alert signal is sent to the vertical bus circuit 412-($i$−2) via the pin ALT($i$-2)' and is further transferred to the host processor 440. In another embodiment, if the modulator 523-1 is in the bottom battery management chip 410-1, the modulator 523-1 can send the encoded alert signal to the converter 413 via the pin ALT0'. The converter 413 converts the received encoded alert signal that is communicated with the second type of protocol into data that can be communicated with the first type of protocol and that can be transferred to the host processor 440 via the pin IRQ.

Figure 6:
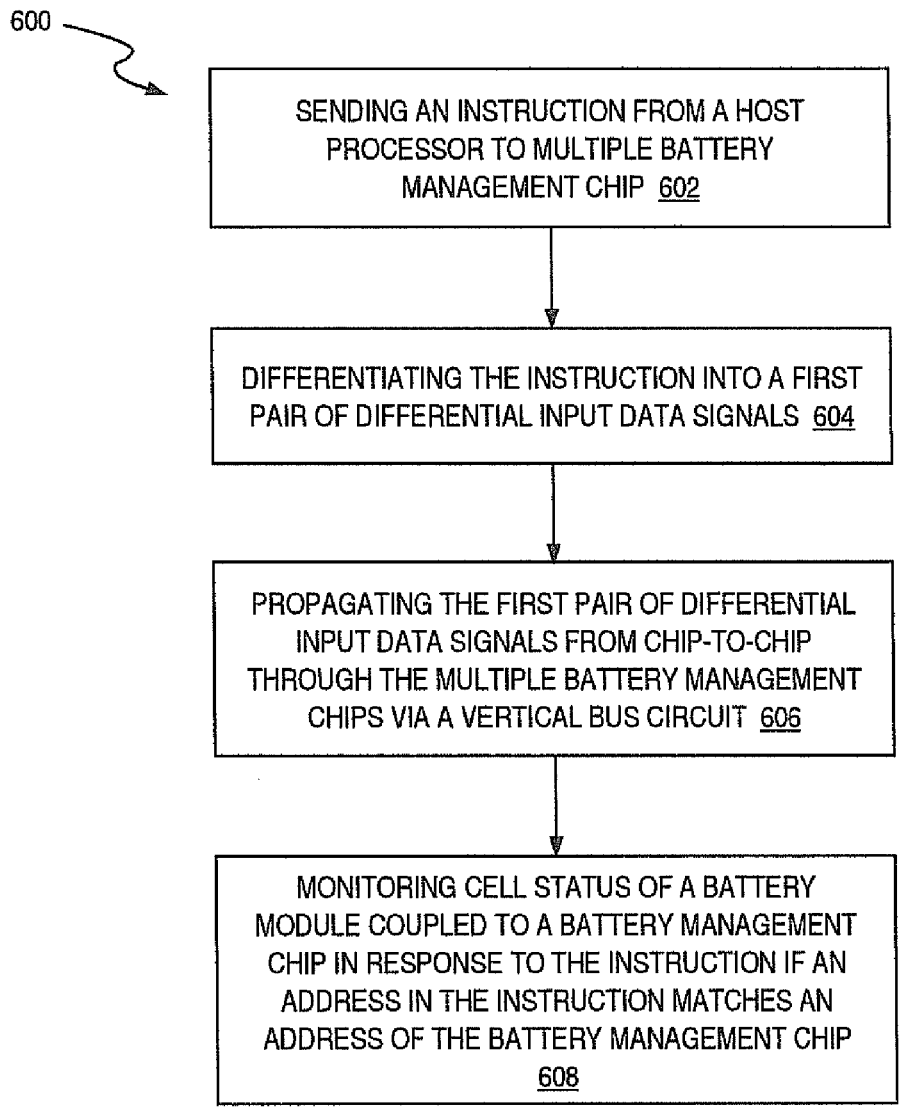
FIG. 6 shows a flowchart of examples of operations performed by a battery management system, in accordance with one embodiment of the present invention.

FIG. 6 shows a flowchart of operations 600 performed by a battery management system, in accordance with one embodiment of the present invention. FIG. 6 is described in combination with FIG. 4.

In block 602, a host processor 440 sends an instruction to multiple battery management chips, e.g., battery management chips 410-1-410-3. The instruction can be for each battery management chip 410-$i$ to monitor and sample the cell status, e.g., cell voltage, of each battery cell in the corresponding battery module 402-$i$.

In block 604, a converter 413 converts the instruction received from the host processor 440 via a pin SDI into a first pair of differential input data signals and transfers the first pair of differential input data signals to the vertical bus circuit 412-1 via pins IN0'− and IN0'+.

In block 606, the battery management chips propagate the first pair of differential input data signals from chip-to-chip via a vertical bus circuit. More specifically, as shown in the example of FIG. 4, the battery management chip 410-1 transfers the first pair of differential input data signals to the battery management chip 410-2 via the vertical bus circuit 412-1, and the battery management chip 410-2 transfers the first pair of differential input data signals to the battery management chip 410-3 via the vertical bus circuit 412-2. As shown in the example of FIG. 4, the pins IN3+, IN3−, OUT3+ and OUT3− of the battery management chip 410-3 are coupled to the ground indicating that the battery management chip 410-3 is the top chip; as such, the battery management chip 410-3 does not transfer the first pair of differential input data signals to any battery management chip.

In block 608, a battery management chip 410-$i$ can monitor cell statuses (e.g., cell voltages) of battery module 402-$i$ if an address in the instruction matches an address of the battery management chip. Further, the battery management chip 410-$i$ can inform the host processor 440 of the statuses of the battery module 402-$i$ by generating and transferring a first pair of differential output data signals. The first pair of differential output data signals can indicate the cell statuses of battery module 402-1 and can be transferred to the converter 413 from chip-to-chip. The converter 413 converts the first pair of differential output data signals into first output data, and sends the first output data to the host processor 440 via a pin SDO to inform the host processor 440 of the cell statuses of battery management chip 402-$i$.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A battery management chip comprising:
    a battery management unit operable for monitoring cell statuses of a plurality of cells in a battery module coupled to said battery management chip in response to an instruction from a host processor; and
    a vertical bus circuit operable for transferring said instruction from said host processor to said battery management unit, wherein said vertical bus circuit comprises:
        a first receiver operable for receiving a first pair of differential input data signals;
        a command processor coupled to said first receiver and operable for processing said first pair of differential input data signals; and
        a first transmitter coupled to said command processor and operable for outputting a first pair of differential output data signals.

2. The battery management chip of claim 1, wherein said vertical bus circuit further comprises:
    a second receiver operable for receiving a second pair of differential input data signals; and
    a second transmitter operable for outputting a second pair of differential output data signals.

3. The battery management chip of claim 2, wherein said vertical bus circuit further comprises:
    a reply generator coupled to said second receiver and said second transmitter, and operable for generating a reply in response to said instruction from said host processor and sending said reply to said second transmitter.

4. The battery management chip of claim 3, wherein said reply generator further receives first data from said second receiver and transfers said first data to said second transmitter.

5. The battery management chip of claim 4, wherein said first data indicates a positive differential signal of said second pair of differential input data signals.

6. The battery management chip of claim 2, wherein said second transmitter comprises an inverter for outputting a negative differential signal of said second pair of differential output data signals.

7. The battery management chip of claim 1, wherein said first receiver comprises:
   a first comparator;
   a second comparator; and
   an offset voltage generator,
   wherein a non-inverting terminal of said first comparator is coupled to an inverting terminal of said second comparator.

8. The battery management chip of claim 7, wherein said non-inverting terminal of said first comparator is coupled to said inverting terminal of said second comparator through said offset voltage generator.

9. The battery management chip of claim 8, wherein said offset voltage generator comprises a voltage source.

10. The battery management chip of claim 1, wherein said first transmitter comprises an inverter operable for receiving second data that is output from said command processor and for outputting a negative differential signal of said first pair of differential output data signals.

11. The battery management chip of claim 10, wherein said second data indicates a positive differential signal of said first pair of differential input data signals.

12. The battery management chip of claim 1, wherein said first pair of differential input data signals indicates said instruction from said host processor.

13. A system, comprising:
   a first chip comprising a first vertical bus circuit;
   a second chip coupled to said first chip via a passive galvanic isolator; and
   a host processor coupled to said first chip and operable for sending first data to said first chip and said second chip,
   wherein said host processor is coupled to said first vertical bus circuit via a converter, and
   wherein said converter converts said first data from a first type of protocol to a first pair of differential data signals that conform to a second type of protocol.

14. The system of claim 13, wherein said first vertical bus circuit receives said first pair of differential data signals.

15. The system of claim 13, wherein said second chip receives said first pair of differential data signals from said first vertical bus circuit.

16. The system of claim 13, wherein said second chip outputs a second pair of differential data signals that conform to said second type of protocol to said first chip.

17. The system of claim 16, wherein said converter converts said second pair of differential data signals from said second type of protocol into second data that conforms to said first type of protocol and sends said second data to said host processor.

18. The system of claim 16, wherein said second pair of differential data signals indicates a reply generated by said second chip in response to said first data.

19. The system of claim 13, wherein said first data indicates an instruction from said host processor.

20. The system of claim 19, wherein said instruction comprises instructing a chip to sample a cell status of a plurality of cells in a corresponding battery module coupled to said chip.

21. The system of claim 13, wherein said passive galvanic isolator comprises a capacitor.

22. A method, comprising:
   sending first data indicating an instruction from a host processor to a plurality of battery management chips;
   converting said first data from a first type of protocol to a first pair of differential input data signals that conform to a second type of protocol by a converter;
   propagating said first pair of differential input data signals from chip-to-chip of said plurality of battery management chips via a vertical bus circuit, wherein said host processor is coupled to said vertical bus circuit via said converter; and
   monitoring cell status of a battery module coupled to a battery management chip in response to said instruction if an address in said instruction matches an address of said battery management chip.

23. The method of claim 22, further comprising:
   outputting a first pair of differential output data signals from said battery management chip,
   wherein said first pair of differential output data signals represents said cell status of said battery module coupled to said battery management chip.

24. The method of claim 23, further comprising:
   converting said first pair of differential output data signals into first output data by said converter; and
   transferring said first output data to said host processor.

* * * * *